(12) United States Patent
Matsuo

(10) Patent No.: US 11,928,373 B2
(45) Date of Patent: Mar. 12, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Taku Matsuo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 376 days.

(21) Appl. No.: 16/889,883

(22) Filed: Jun. 2, 2020

(65) Prior Publication Data
US 2021/0132884 A1  May 6, 2021

(30) Foreign Application Priority Data

Nov. 1, 2019  (JP) ................. 2019-200289

(51) Int. Cl.
*G06F 3/12* (2006.01)
(52) U.S. Cl.
CPC .......... *G06F 3/1255* (2013.01); *G06F 3/1204* (2013.01); *G06F 3/1257* (2013.01); *G06F 3/12* (2013.01)
(58) Field of Classification Search
CPC .... G06F 3/1255; G06F 3/1204; G06F 3/1257; G06F 3/12
USPC ....................................................... 358/1.15
See application file for complete search history.

(56) References Cited

U.S. PATENT DOCUMENTS

| 2004/0190057 | A1* | 9/2004 | Takahashi | G06F 3/1205 |
| | | | | 358/1.15 |
| 2008/0134917 | A1* | 6/2008 | Yamamoto | B41F 13/46 |
| | | | | 101/450.1 |
| 2013/0308875 | A1* | 11/2013 | Jacobson | G06F 18/28 |
| | | | | 382/284 |
| 2014/0124670 | A1* | 5/2014 | Sostek | G01J 5/025 |
| | | | | 250/340 |
| 2018/0114103 | A1* | 4/2018 | Fukami | G06F 3/1253 |
| 2019/0163422 | A1* | 5/2019 | Matsuo | G06F 3/1262 |
| 2021/0132884 | A1* | 5/2021 | Matsuo | G06F 3/1255 |

FOREIGN PATENT DOCUMENTS

| JP | 2009-4912 A | 1/2009 |
| JP | 2017-091303 A | 5/2017 |
| JP | 2019-101778 A | 6/2019 |

OTHER PUBLICATIONS

Jul. 11, 2023 Office Action issued in Japanese Patent Application No. 2019-200289.
Jan. 9, 2024 Office Action issued in Japanese Patent Application No. 2019-200289.

* cited by examiner

*Primary Examiner* — Darryl V Dottin
(74) *Attorney, Agent, or Firm* — Oliff PLC

(57) ABSTRACT

An information processing apparatus includes a processor configured to obtain setting information regarding print settings for first printing employing a plate and output information based on the setting information with respect to whether second printing that does not employ a plate and that is based on the print settings for the first printing is possible.

14 Claims, 12 Drawing Sheets

FIG. 4A
- TYPE OF PAPER: THIN PAPER
- SIZE OF PAGE: A5
- NUMBER OF PAGES: 8 PAGES/SIDE
- ORDER OF PAGES: TOP-FOLDED LEFT BINDING
- COLOR PROFILE: JAPAN COLOR
FIG. 4B
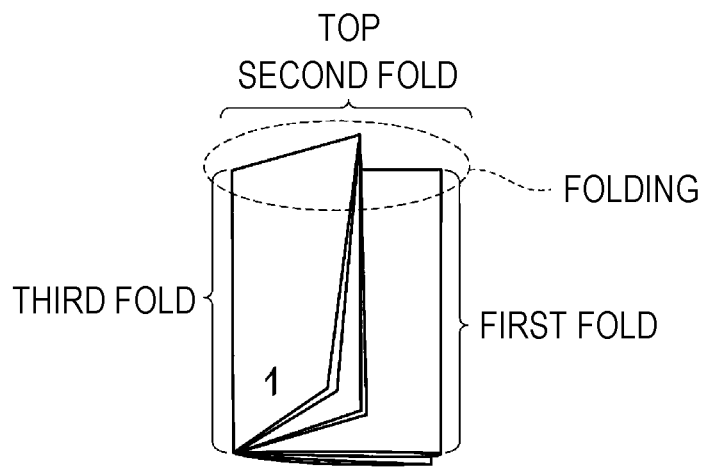
FIG. 4C
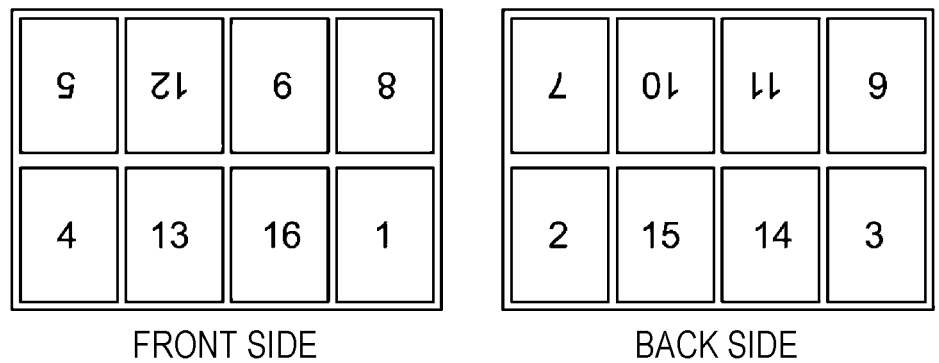

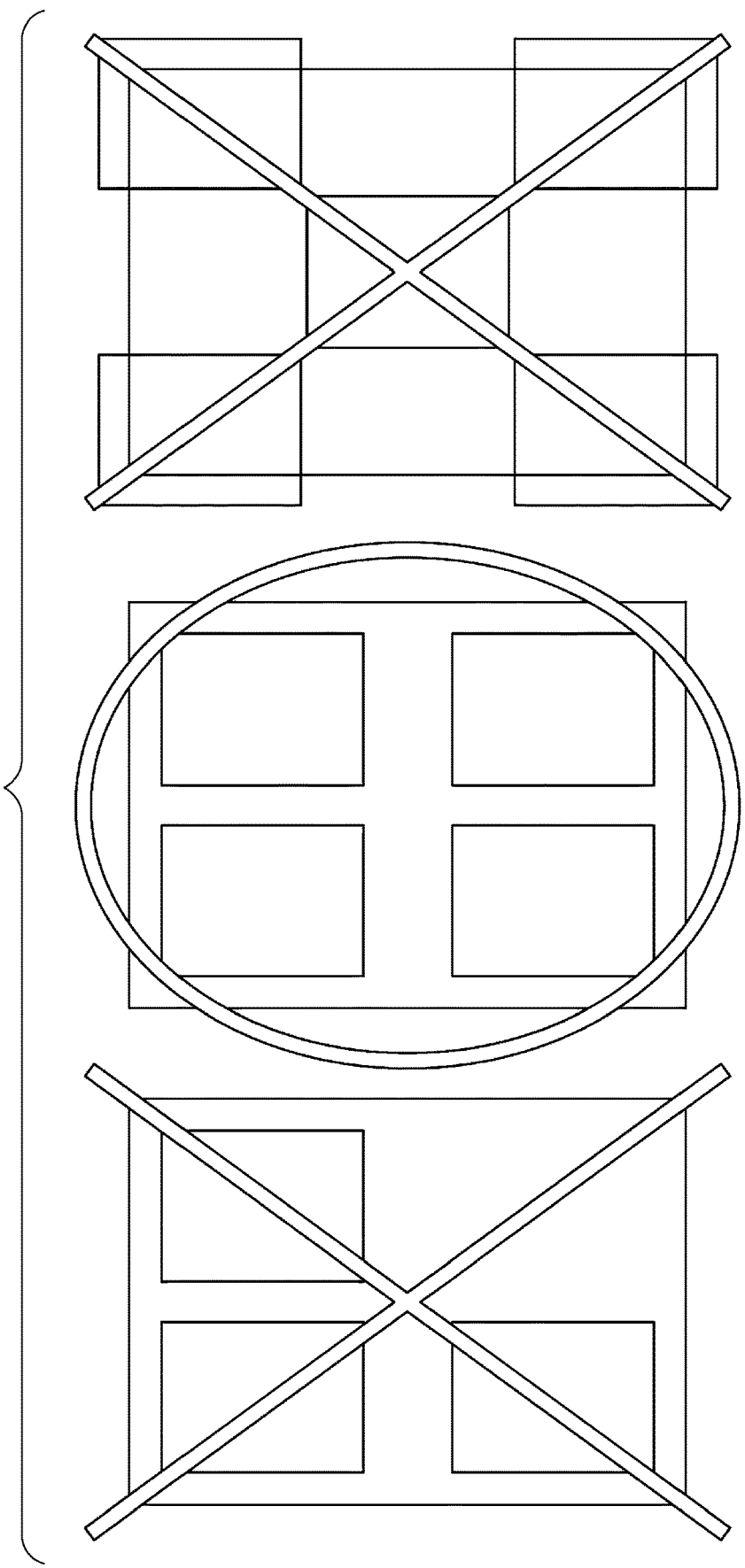

FRONT SIDE          BACK SIDE

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-200289 filed Nov. 1, 2019.

BACKGROUND

(i) Technical Field

The present disclosure relates to an information processing apparatus and a non-transitory computer readable medium.

(ii) Related Art

In Japanese Unexamined Patent Application Publication No. 2009-4912, the content of pages of computer-to-plate (CTP) data is rearranged in accordance with an output mode on the basis of print settings of an offset printing system at a time of printing of original CTP data and print settings of a print-on-demand (POD) system.

SUMMARY

A technique for generating data for printing that does not employ a plate on the basis of print settings for printing employing a plate using data regarding the printing employing a plate is known. Here, depending on the print settings for the printing employing a plate, printing that does not employ a plate and that is based on data which reflects the print settings might not be achieved. It is difficult, however, for a user to recognize whether the printing will be achieved.

Aspects of non-limiting embodiments of the present disclosure relate to enable the user to recognize whether printing that does not employ a plate and that is based on print settings for printing employing a plate is possible.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to obtain setting information regarding print settings for first printing employing a plate and output information based on the setting information with respect to whether second printing that does not employ a plate and that is based on the print settings for the first printing is possible.

BRIEF DESCRIPTION OF THE DRAWINGS

An exemplary embodiment of the present disclosure will be described in detail based on the following figures, wherein:

FIGS. 4A to 4C are diagrams illustrating details of offset printing;

FIG. 5 is a diagram illustrating a setting method used by a number of pages setting unit;

DETAILED DESCRIPTION

An exemplary embodiment of the present disclosure will be described in detail hereinafter with reference to the accompanying drawings.

Configuration of Information Processing System

Figure 1:
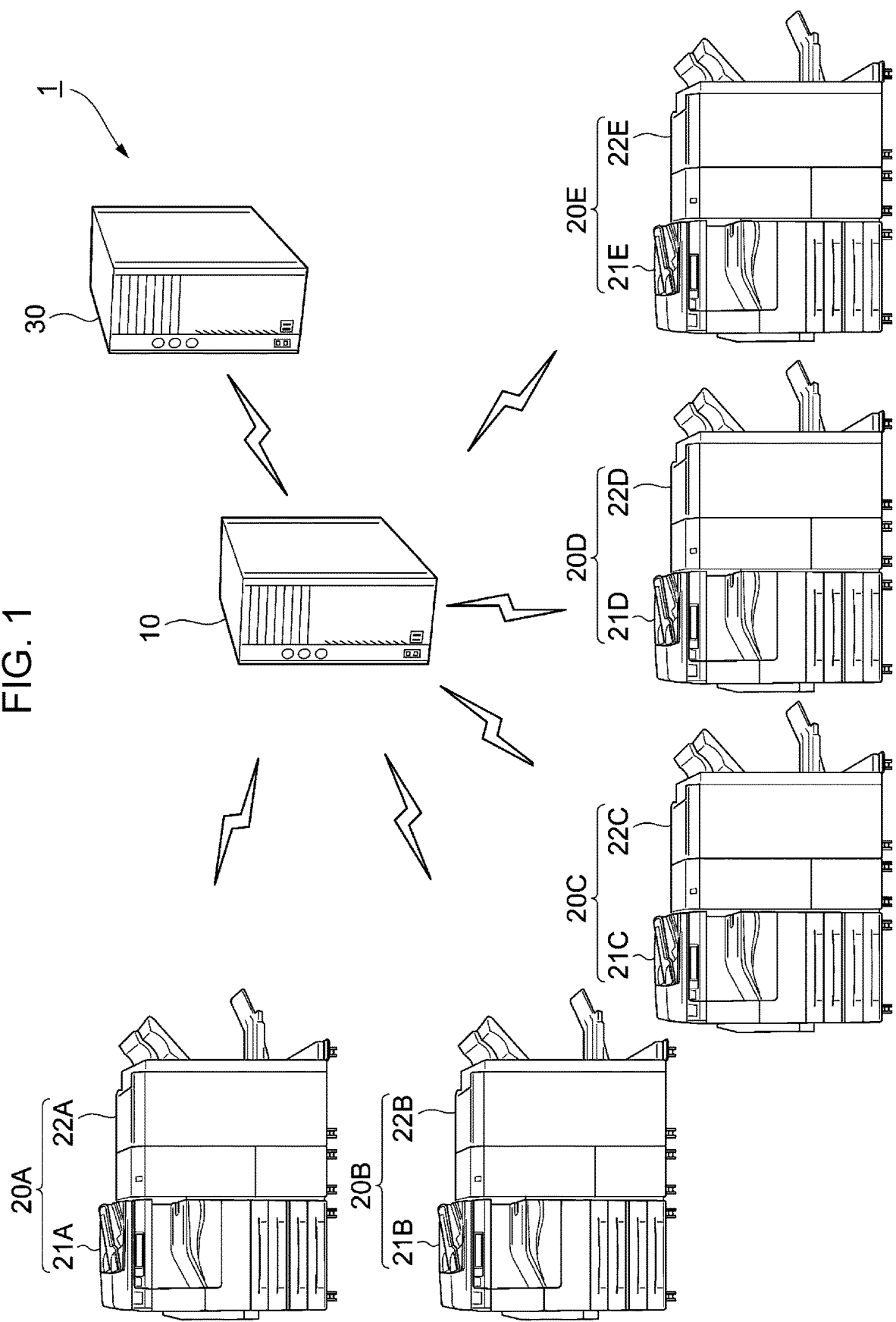
FIG. 1 is a diagram illustrating an example of the overall configuration of an information processing system according to an exemplary embodiment.

FIG. 1 is a diagram illustrating an example of the overall configuration of an information processing system 1 according to the present exemplary embodiment. The information processing system 1 according to the present exemplary embodiment generates data for digital printing on the basis of data for offset printing and performs digital printing using the generated data. Here, offset printing refers to printing employing a plate. Digital printing refers to printing employing not a plate but image data. Offset printing is an example of first printing. Digital printing is an example of second printing.

The information processing system 1 includes a management server apparatus 10, image forming systems 20A to 20E, and a content server apparatus 30. The management server apparatus 10 and the image forming systems 20A to 20E are connected to one another over a network. The management server apparatus 10 and the content server apparatus 30 are connected to each other over the network.

When the image forming systems 20A to 20E are not particularly distinguished from one another, the image forming systems 20A to 20E will be simply referred to as "image forming systems 20".

The management server apparatus 10 as an example of an information processing apparatus is a server that communicates data with the image forming systems 20 and the content server apparatus 30 over the network. The management server apparatus 10 is achieved, for example, by a computer. The management server apparatus 10 may be achieved by a single computer or by plural computers through distributed processing.

The image forming systems 20A to 20E include image forming apparatuses 21A to 21E and post-processing apparatuses 22A to 22E, respectively.

When the image forming apparatuses 21A to 21E are not particularly distinguished from one another, the image forming apparatuses 21A to 21E will be simply referred to as "image forming apparatuses 21". When the post-processing apparatuses 22A to 22E are not particularly distinguished from one another, the post-processing apparatuses 22A to 22E will be simply referred to as "post-processing apparatuses 22".

The image forming apparatuses 21 are so-called tandem digital color printers. The image forming apparatuses 21 form images on sheets of paper, which are an example of a recording medium, on the basis of image data. As the image forming apparatuses 21, electrophotographic printers, which form toner images on sheets of paper, or inkjet printers, which discharge ink onto sheets of paper, may be used.

In the present exemplary embodiment, what can be achieved by printing is different between the image forming apparatuses 21. More specifically, settings that can be made for printing are provided for the image forming apparatuses 21, and items of the settings for printing that can be set are different between the image forming apparatuses 21. The settings for printing will be referred to as "print settings" hereinafter.

The print settings include, for example, a type of paper on which images are to be formed, the size of paper on which images are to be formed, and a type of specification used for a color profile. Different types of paper may be defined, for example, in accordance with paper quality. Alternatively, different types of paper may be defined, for example, in accordance with basis weight. The color profile is a set of data for performing color conversion. That is, the type of specification used for a color profile can be regarded as a type of specification defined for color of images formed as a result of printing. The color profile may be, for example, an International Color Consortium (ICC) profile. Types of specification used for a color profile include, for example, standard red green blue (sRGB), Adobe RGB, and Japan Color. The type of paper, the size of paper, and the type of specification used for a color profile are predetermined print settings.

The post-processing apparatuses 22 perform post-processing on sheets of paper on which the image forming apparatuses 21 have formed images. The post-processing includes, for example, a process for binding sheets, a process for folding sheets, a process for cutting sheets, and a bookbinding process.

In the present exemplary embodiment, items of settings that can be set for post-processing are different between the post-processing apparatuses 22. Settings for the process for binding sheets include, for example, the number of points at which the sheets are bound and an area in which the sheets are bound. Settings for the process for folding sheets include, for example, the number of times the sheets are folded and an area in which the sheets are folded. Settings for the process for cutting sheets include, for example, an area in which the sheets are cut.

The content server apparatus 30 is a server that manages data used for offset printing. Data used for offset printing may be, for example, JDF data, image data, or the like. JDF data is data whose print settings are specified in JDF. JDF is a standard format for specifying a whole printing process defined by Cooperation for Integration of Processes in Prepress, Press, and Postpress (CIP4). Image data may be, for example, portable document format (PDF) data.

The content server apparatus 30 is achieved, for example, by a computer. The content server apparatus 30 may be achieved by a single computer or by plural computers through distributed processing.

The network used to connect the management server apparatus 10 and the image forming systems 20 to each other and the management server apparatus 10 and the content server apparatus 30 to each other may be any kind of network insofar as data can be communicated. A communication link used to communicate data may be a wired link or a wireless link.

Although five image forming systems 20 are used in the example illustrated in FIG. 1, the number of image forming systems 20 is not limited to five. The information processing system 1 may include four or less image forming systems 20 or six or more image forming systems 20, instead.

Configuration of Management Server Apparatus

Figure 2:
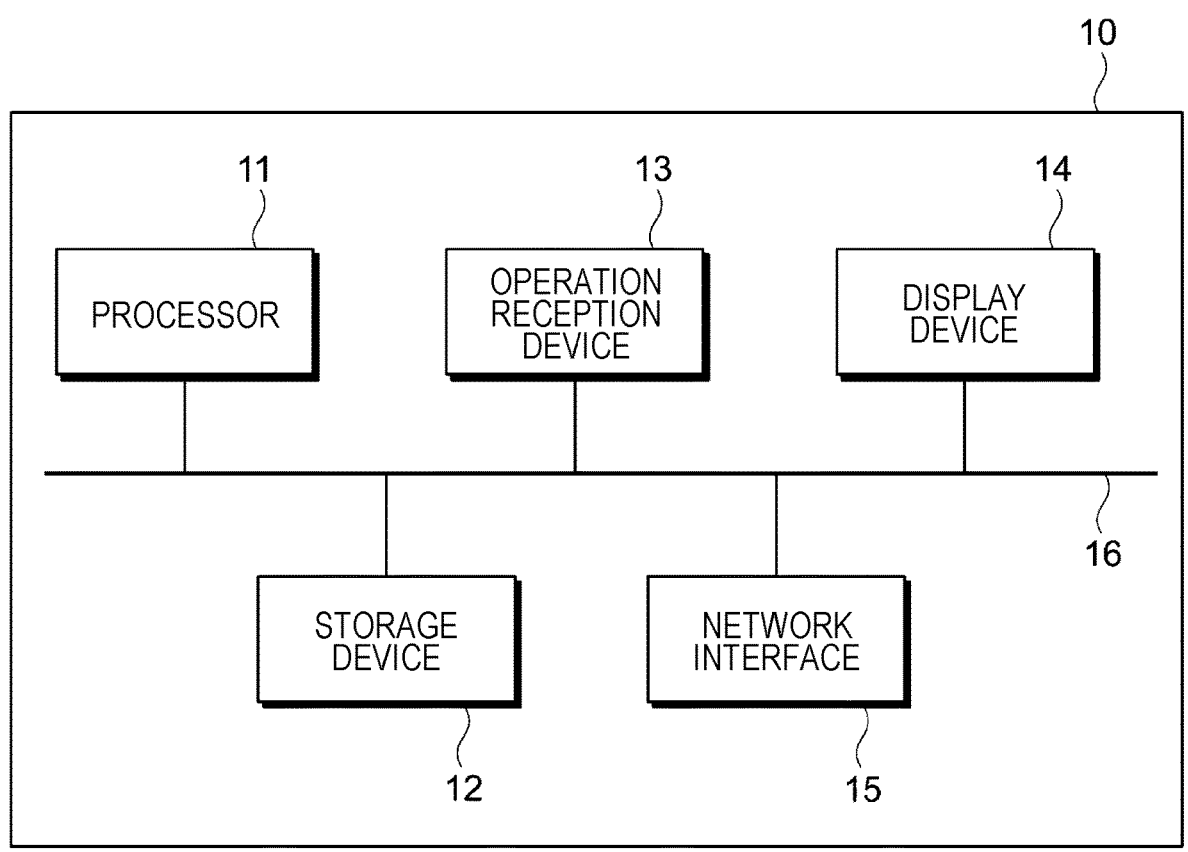
FIG. 2 is a diagram illustrating the hardware configuration of a management server apparatus.

Next, the hardware configuration of the management server apparatus 10 will be described. FIG. 2 is a diagram illustrating the hardware configuration of the management server apparatus 10.

The management server apparatus 10 includes a processor 11 that controls the operation of the management server apparatus 10 by executing a program, a storage device 12 storing the program to be executed by the processor 11 and various pieces of data, an operation reception device 13 that receives a user's operations, a display device 14 that displays operation screens used by the user, and a network interface 15 that achieves communication with the image forming systems 20 and the content server apparatus 30. These components are connected to one another by a signal line 16 such as a data bus, an address bus, or a peripheral component interconnect (PCI) bus.

The processor 11 is achieved, for example, by a central processing unit (CPU). Various functions are achieved by executing processes based on the program stored in the storage device 12 using the processor 11.

The storage device 12 includes, for example, a read-only memory (ROM) storing a basic input/output system (BIOS) and the like, a random-access memory (RAM) used as a working area, and a hard disk device storing a basic program, application programs, and the like. The ROM and the RAM may be included in the processor 11, instead.

The operation reception device 13 is achieved, for example, by a keyboard, a mouse, mechanical buttons, and switches. The operation reception device 13 may be a touch sensor integrated with the display device 14 to form a touch panel, instead.

The display device 14 is achieved by a liquid crystal display or an organic electroluminescent (EL) display used to display information.

Functional Configuration of Management Server Apparatus 10

Figure 3:
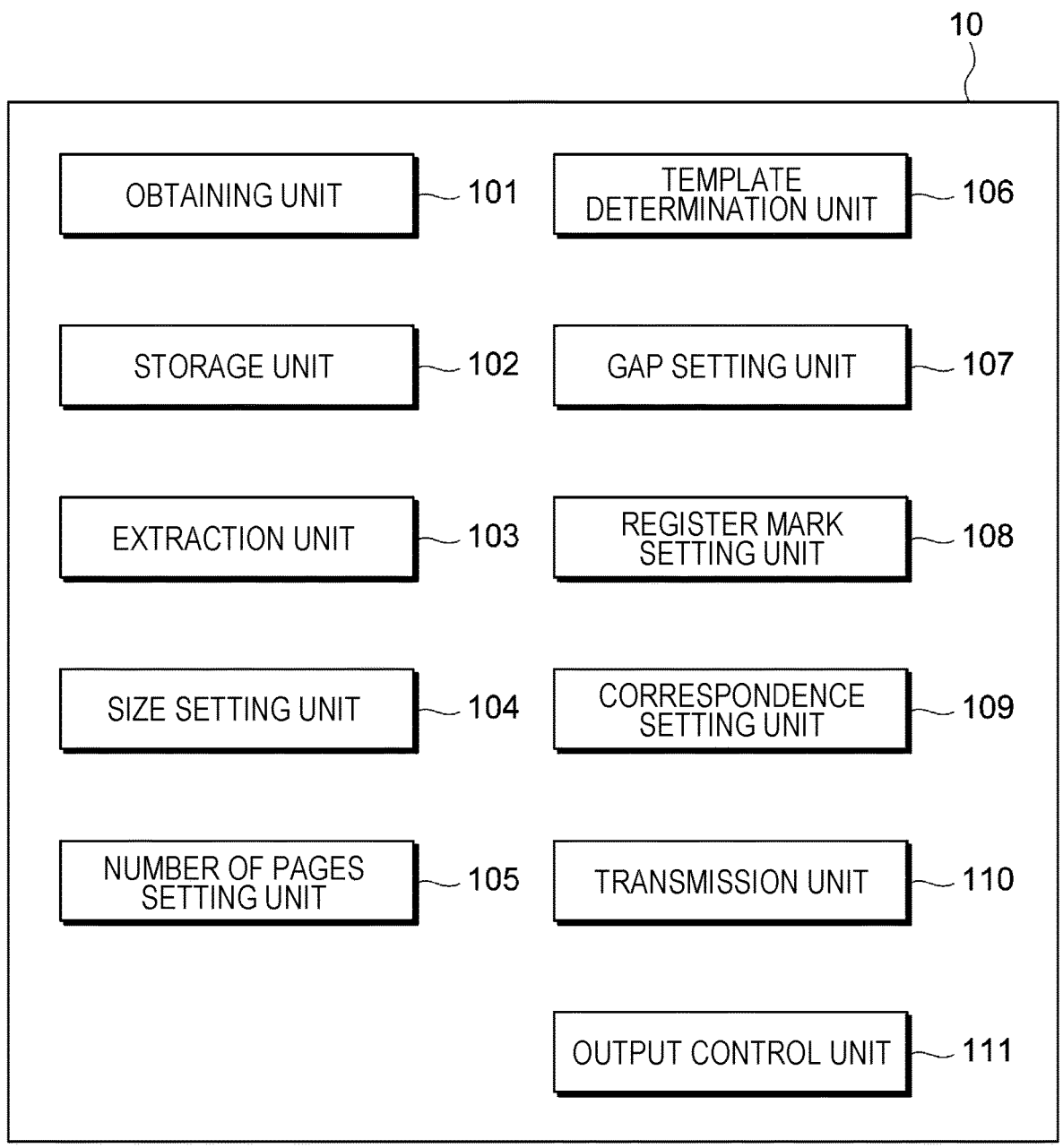
FIG. 3 is a block diagram illustrating an example of the functional configuration of the management server apparatus.

Next, the functional configuration of the management server apparatus 10 will be described. FIG. 3 is a block diagram illustrating an example of the functional configuration of the management server apparatus 10.

FIG. 3 illustrates part of functions achieved by executing the application programs using the processor 11.

The management server apparatus 10 includes an obtaining unit 101, a storage unit 102, an extraction unit 103, a size setting unit 104, a number of pages setting unit 105, a template determination unit 106, a gap setting unit 107, a register mark setting unit 108, a correspondence setting unit 109, a transmission unit 110, and an output control unit 111.

The obtaining unit 101 obtains JDF data and image data from the content server apparatus 30. When instructed to perform digital printing on the basis of data used for offset printing, the obtaining unit 101 obtains JDF data and image data used for the offset printing from the content server apparatus 30. In addition, when instructed to generate data for digital printing on the basis of data used for offset printing, the obtaining unit 101 may obtain JDF data and image data used for the offset printing from the content server apparatus 30.

The storage unit 102 stores functions of each of the image forming systems 20. More specifically, the storage unit 102 stores, for each image forming apparatus 21, items of print settings that can be set in the image forming apparatus 21. The storage unit 102 also stores, for each post-processing apparatus 22, items of settings for post-processing that can be set in the post-processing apparatus 22.

The extraction unit 103 extracts an image forming system 20 capable of performing digital printing based on print settings for offset printing. The extraction unit 103 obtains JDF data used for the offset printing from the obtaining unit 101. The extraction unit 103 also compares items of the print settings for the offset printing indicated by the obtained JDF data with items stored in the storage unit 102 as items of print settings that can be set in each image forming system 20. The extraction unit 103 determines, on the basis of a result of the comparison, whether each image forming system 20 is capable of performing digital printing based on the print settings for the offset printing. The extraction unit 103 then determines an image forming system 20 capable of performing the digital printing based on the print settings for the offset printing.

If a type of paper specified in the print settings for the offset printing cannot be made in print settings of an image forming system 20, the extraction unit 103 determines that the image forming system 20 is incapable of performing the digital printing based on the print settings for the offset printing. If a type of color profile specified in the print settings for the offset printing cannot be specified in print settings of an image forming system 20, the extraction unit 103 determines that the image forming system 20 is incapable of performing the digital printing based on the print settings for the offset printing. The type of color profile refers to a type of specification used for a color profile. The extraction unit 103 extracts an image forming system 20 that has not been determined to be incapable of performing the digital printing in terms of the type of paper and the type of specification used for a color profile as an image forming system 20 capable of performing the digital printing based on the print settings for the offset printing. If there are plural image forming systems 20 that have not been determined to be incapable of performing the digital printing in terms of the type of paper and the type of specification used for a color profile, the extraction unit 103 extracts all the plural image forming systems 20.

The size setting unit 104 sets the size of paper used in printing performed by the image forming systems 20. Depending on print settings of an image forming system 20, the size of paper used in offset printing cannot be set. In this case, a size of paper different from the size of paper used in the offset printing needs to be set for printing to be performed by the image forming systems 20.

The size setting unit 104 sets a maximum settable size in print settings of an image forming system 20 extracted by the extraction unit 103 as the size of paper to be used in printing to be performed by the image forming system 20. The maximum settable size of paper is a maximum size of paper settable in the print settings of the image forming system 20 along with a type of paper and a type of specification used for a color profile set in print setting for offset printing. The size setting unit 104 generates JDF data indicating the set size of paper, the set type of paper, the set type of specification used for a color profile. The JDF data is JDF data for digital printing.

The number of pages setting unit 105 sets the number of pages assigned to each side of sheets used in printing. Depending the print settings of an image forming system 20, the number of pages assigned to each side of sheets cannot be set for offset printing. In this case, the number of pages assigned to each side of sheets different from the number of pages assigned to each side of sheets for the offset printing needs to be set for printing to be performed by the image forming system 20.

The number of pages setting unit 105 sets the number of pages assigned to each side of sheets for the printing to be performed by the image forming system 20 on the basis of the size of paper set by the size setting unit 104 and the size of each page set for the offset printing. More specifically, the number of pages setting unit 105 sets the maximum number of pages assigned to each side of sheets whose size has been set by the size setting unit 104 as the number of pages assigned to each side of sheets for the printing to be performed by the image forming systems 20. The maximum number of pages assigned to each side of sheets is the maximum number of pages, each of which has a size set for the offset printing, that can be arranged on each side of sheets whose size has been set by the size setting unit 104. Information regarding the size of each page in the offset printing can be identified from the JDF data obtained by the obtaining unit 101.

The number of pages setting unit 105 writes information indicating the set number of pages into the JDF data for digital printing.

The template determination unit 106 determines, among plural templates, a template to be used in printing to be performed by an image forming systems 20. In the template, arrangement of pages on sheets and a direction of images on each page are determined. In the present exemplary embodiment, plural templates that offer different types of arrangement of pages on sheets and different directions of images on each page are provided and stored in the storage unit 102.

The template determination unit 106 determines, as a template to be used in printing, a template that suits the number of pages set by the number of pages setting unit 105 and items of settings for post-processing performed by an image forming system 20. The template determination unit 106 determines a type of post-processing to be performed by the image forming system 20 in accordance with the determined template.

The template determination unit 106 writes, into JDF data for digital printing, information indicating the determined template and information indicating the type of post-processing to be performed by the image forming system 20.

The gap setting unit 107 sets a position of a gap. A gap refers to a blank area of each sheet in which no image is formed. When cutting a sheet, the post-processing apparatus 22 of the image forming system 20 cuts off an area of the sheet set as a gap.

The gap setting unit 107 sets a position of a gap in accordance with a type of post-processing that can be performed by the post-processing apparatus 22. That is, because an area of each sheet that can be cut off is different between the post-processing apparatuses 22, the gap setting unit 107 sets a position of a gap such that a post-processing apparatus 22 to be used for digital printing can appropriately cut sheets. The gap setting unit 107 then writes information indicating the set position of a gap into JDF data for digital printing.

The register mark setting unit 108 sets a position of a register mark to be formed on each sheet. The register mark is an image used to identify a timing at which the post-processing apparatus 22 performs post-processing. The post-processing apparatus 22 performs post-processing, for example, when a register mark formed on a sheet is detected.

In the present exemplary embodiment, the register mark setting unit 108 sets a position of a register mark in accordance with a type of post-processing that can be performed by the post-processing apparatus 22. That is, because a timing of post-processing is different between the post-processing apparatuses 22, the register mark setting unit 108 sets a position of a register mark such that a post-processing apparatus 22 to be used for digital printing can appropriately perform post-processing. The register mark setting unit 108 writes information indicating the set position of a register mark into JDF data for digital printing.

The correspondence setting unit 109 sets correspondences between images indicated by image data used for offset printing and images to be formed on sheets in digital printing. More specifically, the correspondence setting unit 109 associates one of the images indicated by the image data used for the offset printing with one of pages defined in a template determined by the template determination unit 106. The correspondence setting unit 109 writes information indicating the correspondences into JDF data for digital printing.

The transmission unit 110 transmits JDF data for digital printing and image data used for offset printing to an image forming system 20. More specifically, the transmission unit 110 transmits JDF data into which information has been written by the size setting unit 104, the number of pages setting unit 105, the template determination unit 106, the gap setting unit 107, the register mark setting unit 108, and the correspondence setting unit 109 and image data used for offset printing to an image forming system 20. As a result, the image forming system 20 performs digital printing and post-processing employing the obtained image data on the basis of print settings and settings for post-processing indicated by the obtained JDF data.

The output control unit 111 displays information generated by the management server apparatus 10 on the display device 14 of the management server apparatus 10. The output control unit 111 displays, for example, information regarding an image forming system 20. More specifically, the output control unit 111 displays information regarding an image forming system 20 extracted by the extraction unit 103 as an image forming system 20 capable of performing digital printing based on print settings for offset printing.

Details of Offset Printing

Next, details of offset printing will be described.

FIGS. 4A to 4C are diagrams illustrating details of offset printing.

FIG. 4A illustrates items of print settings in offset printing. The items are indicated in JDF data obtained by the obtaining unit 101 from the content server apparatus 30.

FIG. 4A illustrates, as details of print settings for offset printing, the type of paper, the size of each page, the number of pages assigned to each side of sheets, order of pages, and the type of specification used for a color profile. The information illustrated in FIG. 4A as the items of print settings for offset printing can be regarded as setting information relating to the print settings for the offset printing.

"Thin paper", which is a type of paper used in the offset printing, is indicated as the type of paper.

"A5", which is a size of each page in the offset printing, is indicated as the size of each page.

"8 pages/side" is indicated as the number of pages assigned to each side of sheets. This means that the number of pages assigned to each side of sheets on which the offset printing has been performed is eight.

"Top-folded left binding", which is a type of post-processing performed on sheets subjected to offset printing, is indicated as order of pages. That is, the type of the post-processing is indicated as information for specifying the order of pages to be arranged on each sheet. As illustrated in FIG. 4B, "top-folded left binding" is a type of post-processing in which each sheet is folded three times, a third fold being located on a left side in FIG. 4B and a second fold being located at a top (top in FIG. 4B). A first fold and the second fold of each sheet are cut, and a position near the third fold is bound. As a result, a booklet having A5 pages is created.

As illustrated in FIG. 4A, "Japan Color" is indicated as the type of specification used for a color profile.

Here, the arrangement of pages and the direction of an image on each page of the sheets subjected to the offset printing are identified from the number of pages "8 pages/side" assigned to each side of sheets and the type of the post-processing "top-folded left binding" included in the information indicated by the JDF data.

FIG. 4C is a diagram illustrating the arrangement of pages and the direction of an image on each page identified from the number of pages assigned to each side of sheets and the type of post-processing. Numbers illustrated in FIG. 4C indicate page numbers corresponding to images formed on the sheet. As illustrated in FIG. 4C, it is identified that an image on a fifth page, an image on a twelfth page, an image on a ninth page, and an image on an eighth page are arranged in an upper part of a front side of the sheet in this order from the left. It is also identified that these images are arranged upside down. In addition, it is identified that an image on a fourth page, an image on a thirteenth page, an image on a sixteenth page, and an image on a first page are arranged in a lower part of the front side of the sheet in this order from the left.

In addition, it is identified that an image on a seventh page, an image on a tenth page, an image on an eleventh page, and an image on a sixth page are arranged in an upper part of a back side of the sheet in this order from the left. It is also identified that these images are arranged upside down. In addition, it is identified that an image on a second page, an image on a fifteenth page, an image on a fourteenth page, and an image on a third page are arranged in a lower part of the back side of the sheet in this order from the left.

By arranging the image on each page in this manner, the page numbers of the three-folded sheet and the direction of the images on the pages are aligned with one another.

Process Performed by Extraction Unit 103

Next, a process performed by the extraction unit 103 will be described.

The extraction unit 103 extracts an image forming system 20 capable of performing digital printing based on the type of paper "thin paper" and the type of specification used for a color profile "Japan Color" in the information illustrated in FIG. 4A. That is, the extraction unit 103 extracts an image forming system 20 capable of setting the type of paper "thin paper" and the type of specification used for a color profile "Japan Color" as print settings. The extracted image forming system 20 then performs the digital printing and post-processing to create a 16-page booklet having A5 pages created through offset printing.

Process Performed by Number of Pages Setting Unit 105

Next, a process performed by the number of pages setting unit 105 will be described. FIG. 5 is a diagram illustrating a setting method used by the number of pages setting unit 105. A case where the size setting unit 104 sets SRA3 as the size of paper to be used in digital printing will be described hereinafter. As illustrated in FIG. 4A, the size of each page is A5 in the offset printing.

As illustrated in FIG. 5, when A5 pages are arranged on a sheet whose size is SRA3, the maximum number of pages that can be arranged is four. That is, when the number of pages arranged on the sheet is three, a blank of one page is caused, and when the number of pages arranged on the sheet is five, the sheet is too small for the pages. In this case, the number of pages setting unit 105 sets the number of pages assigned to each side of sheets at four, which is the maximum number of pages that can be arranged on the sheet.

Process Performed by Template Determination Unit 106

Figure 6A:
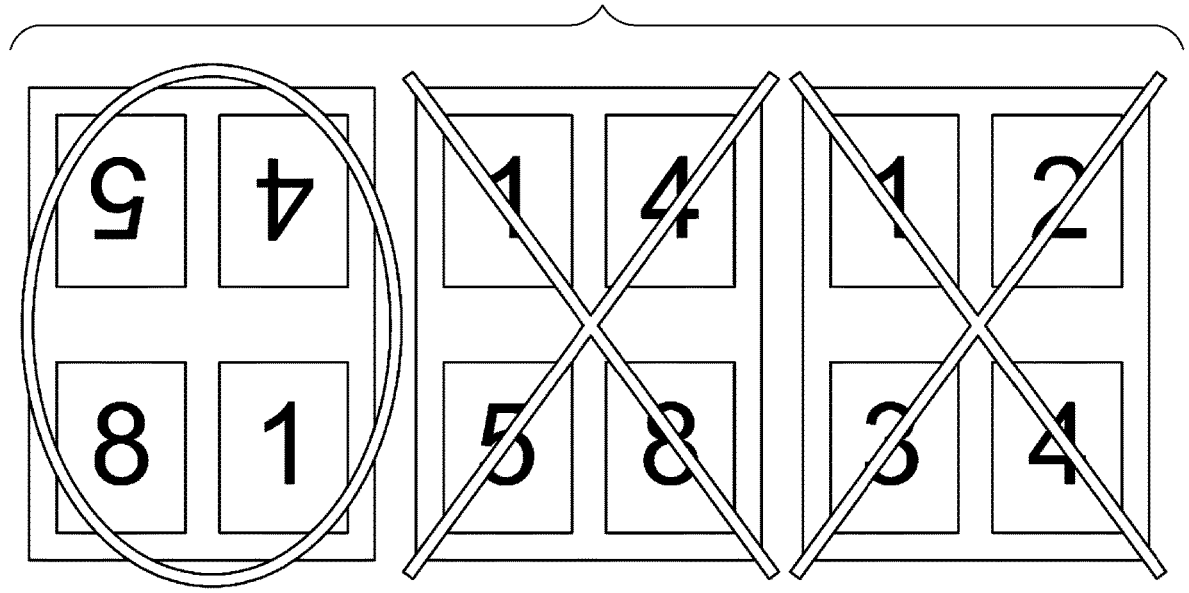
FIG. 6A is a diagram illustrating a template determined by a template determination unit and FIG. 6B is a diagram illustrating a process for changing the size of the template performed by the template determination unit.
Figure 6B:
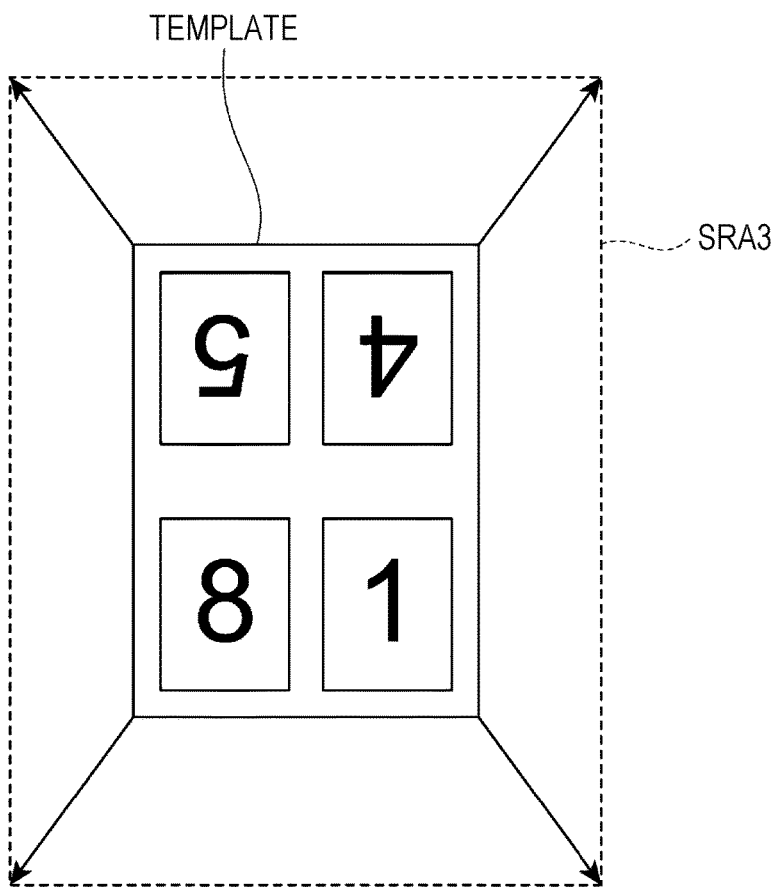

Next, a process performed by the template determination unit 106 will be described. FIG. 6A is a diagram illustrating a template determined by the template determination unit 106, and FIG. 6B is a diagram illustrating a process for changing the size of the template performed by the template determination unit 106. A case where an image forming system 20 to be used for printing is capable of performing double folding as post-processing will be described hereinafter.

As described above, the number of pages assigned to each side of sheets is set at four. In this case, the template determination unit 106 determines templates in which the number of pages assigned to each side of sheets is four as candidates for a template to be used in printing as illustrated in FIG. 6A. As described above, the image forming system 20 to be used for printing is capable of performing double folding. In this case, the template determination unit 106 determines a template in which page numbers and images are arranged such that pages and images on the pages are aligned in a double-folded sheet as the template to be used in digital printing. In the example illustrated in FIG. 6A, the template determination unit 106 determines a leftmost template as the template to be used in digital printing. The template determination unit 106 also determines that the image forming system 20 to be used for printing is to perform double folding and cutting as post-processing.

When an image forming system 20 is incapable of double folding as post-processing, for example, the template determination unit 106 determines a template different from the determined one as the template to be used in digital printing.

Next, the template determination unit 106 changes the size of the template to be used in digital printing to a size set by the size setting unit 104 as the size of paper to be used in printing. In this example, the template determination unit 106 enlarges the size of the template to SRA3, which is the size of paper to be used in printing, as illustrated in FIG. 6B.

Figure 7A:
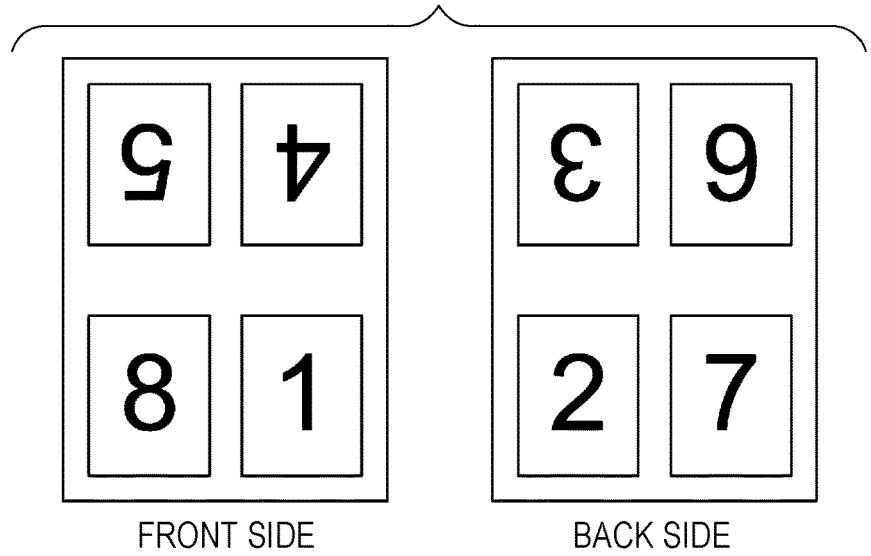
FIG. 7A is a diagram illustrating the template determined by the template determination unit.

FIG. 7A is a diagram illustrating the template determined by the template determination unit 106. An image on a fifth image and an image on a fourth image are arranged in an upper part of a front side of the template in this order from the left. These images are arranged upside down. In addition, an image on an eighth page and an image on a first page are arranged in a lower part of the front side of the template in this order. An image on a third page and an image on a sixth page are arranged in an upper part of a back side of the template in this order from the left. These images are arranged upside down. An image on a second page and an image on a seventh page are arranged in a lower part of the back side of the template in this order from the left.

Figure 7B:
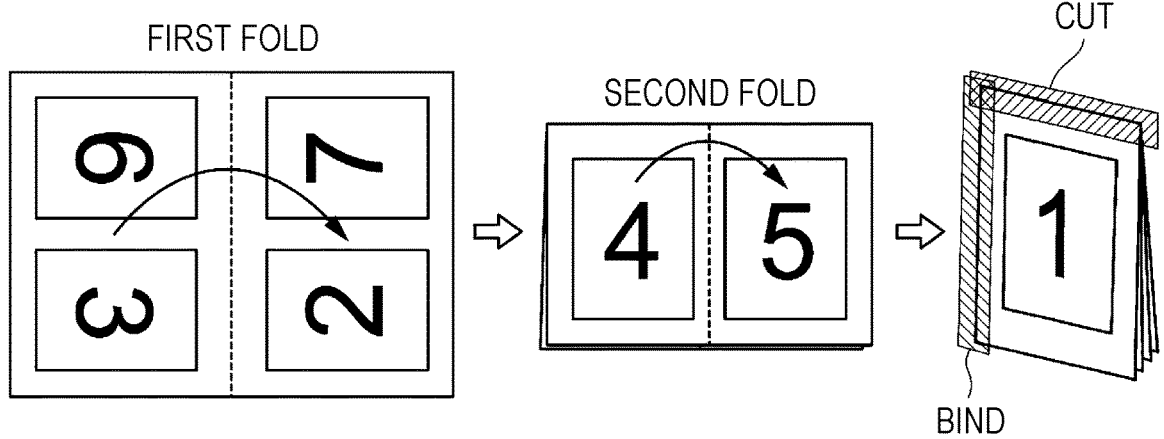
FIG. 7B is a diagram illustrating a folded sheet.
Figure 7C:
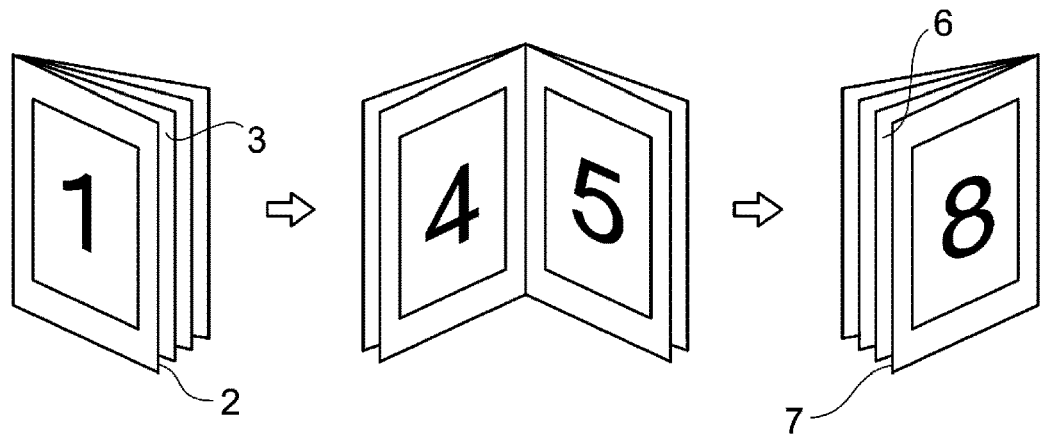
FIG. 7C is a diagram illustrating a cut sheet.

In the present exemplary embodiment, the image on each page is formed on a sheet, and the sheet on which the images are formed are double-folded as illustrated in FIG. 7B. The image forming system 20 binds a left side of the double-folded sheet and cuts a top side of the double-folded sheet. As a result, as illustrated in FIG. 7C, page numbers of 1 to 8 and the images on the pages are aligned with one another. Although not illustrated, a second sheet is also subjected to digital printing and post-processing based on the template determined by the template determination unit 106, and page numbers of 9 to 16 and images on pages are aligned with one another. As a result, a 16-page booklet having A5 pages is created though offset printing.

The template determination unit 106 thus sets a template that suits a type of post-processing that can be performed by an image forming system 20.

Process for Generating JDF Data

Next, a process for generating JDF data performed by the management server apparatus 10 will be described. The process for generating JDF data is a process for generating JDF data for digital printing to be performed by the management server apparatus 10 on the basis of data used for offset printing. In the present exemplary embodiment, the obtaining unit 101 of the management server apparatus 10 receives an instruction to perform digital printing based on data used for offset printing, and the process for generating JDF data starts. Alternatively, the process for generating JDF data may start when the obtaining unit 101 receives an instruction to generate data for digital printing based on data used for offset printing.

Figure 8:
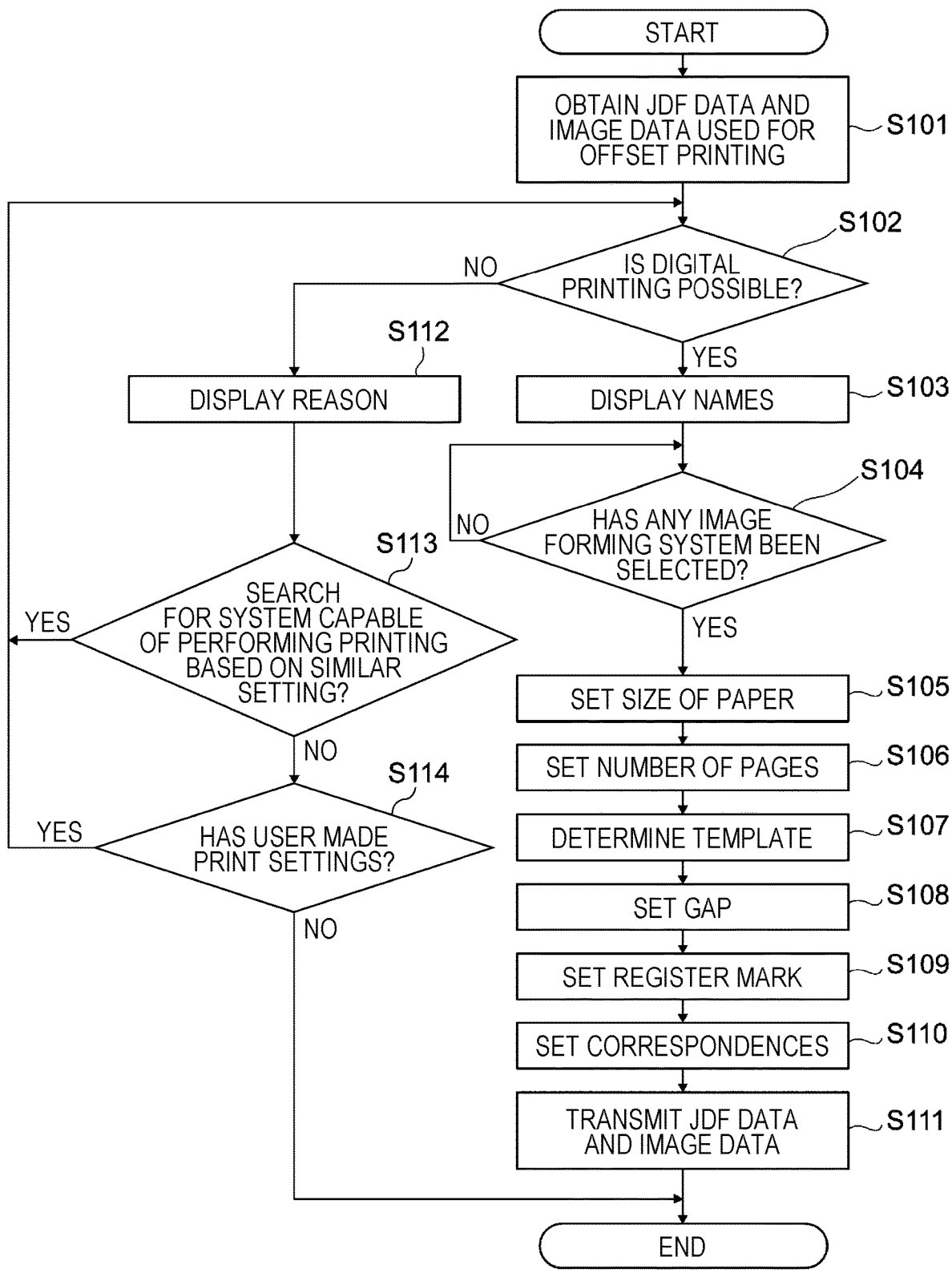
FIG. 8 is a flowchart illustrating a process for generating job definition format (JDF) data.

FIG. 8 is a flowchart illustrating the process for generating JDF data.

First, the obtaining unit 101 obtains JDF data and image data used for offset printing (S101).

The extraction unit 103 determines whether digital printing based on print settings for the offset printing is possible (S102). More specifically, the extraction unit 103 compares the print settings for the offset printing with items that can be set by the image forming systems 20. The extraction unit 103 then determines whether there are image forming systems 20 capable of performing the digital printing based on the print settings for the offset printing to determine whether the digital printing is possible.

If there are image forming systems 20 capable of performing the digital printing (YES in S102), the processor 11 displays names of the image forming systems 20 determined by the extraction unit 103 to be capable of performing the digital printing on the display device 14 of the management server apparatus 10 (S103).

The output control unit 111 determines whether the user has selected an image forming system 20 to perform the digital printing from the image forming systems 20 determined by the extraction unit 103 to be capable of performing the digital printing (S104). Until a result of S104 becomes positive, the output control unit 111 keeps performing S104.

If the user selects an image forming system 20 to perform the digital printing (YES in S104), on the other hand, the process proceeds to a next step.

The size setting unit 104 sets the size of paper to be used in the digital printing to be performed by the image forming system 20 selected by the user (S105).

The number of pages setting unit 105 sets the number of pages assigned to each side of sheets to be used in the digital printing to be performed by the image forming system 20 (S106).

The template determination unit 106 determines a template to be used in the digital printing to be performed by the image forming system 20 (S107).

The gap setting unit 107 sets a position of a gap (S108).

The register mark setting unit 108 sets a position of a register mark (S109).

The correspondence setting unit 109 sets correspondences between images indicated by the image data used for the offset printing and images to be formed on pages in the digital printing to be performed by the image forming system 20 (S110).

The transmission unit 110 transmits, to the image forming system 20, JDF data for the digital printing that reflects results of S105 to S110 and the image data used for the offset printing (S111). As a result, the image forming system 20 performs the digital printing based on the print settings for the offset printing.

If the extraction unit 103 determines that there are no image forming systems 20 capable of performing the digital printing based on the print settings for the offset printing (NO in S102), the output control unit 111 displays, on the display device 14, a reason why the digital printing is not possible (S112).

The output control unit 111 determines whether to search for an image forming system 20 capable of performing digital printing based on a setting similar to one of the print settings for the offset printing (S113). The output control unit 111 determines whether to search for an image forming system 20 capable of performing digital printing based on a setting similar to one of the print settings for the offset printing on the basis of whether the user has selected to search for such an image forming system 20. The setting similar to one of the print settings for the offset printing is a setting determined to be similar to one of the print settings for the offset printing.

If the user has selected to search for an image forming system 20 (YES in S113), the process proceeds to a next step. The extraction unit 103 compares items of settings similar to items of the print settings for the offset printing and items that can be set in the print settings of the image forming systems 20 and determines whether there is an image forming system 20 capable of performing the digital printing based on the setting similar to one of the print settings for the offset printing (S102).

If the user has not selected to search for an image forming system 20 (NO in S113), the output control unit 111 determines whether the user has made the print settings for the digital printing (S114). The output control unit 111 determines whether the user has made the print settings on the basis of whether the user has selected to make the print settings.

If the user has selected to make the print settings (YES in S114), the extraction unit 103 compares items of the print settings set by the user with items that can be set in the print settings of the image forming systems 20 and determines whether there is an image forming system 20 capable of performing digital printing based on the print settings made by the user (S102).

If the user has not selected to make the print settings (NO in S114), the process for generating JDF data ends.

Information Displayed on Display Device 14

Next, information displayed on the display device 14 will be described.

Figure 9A:
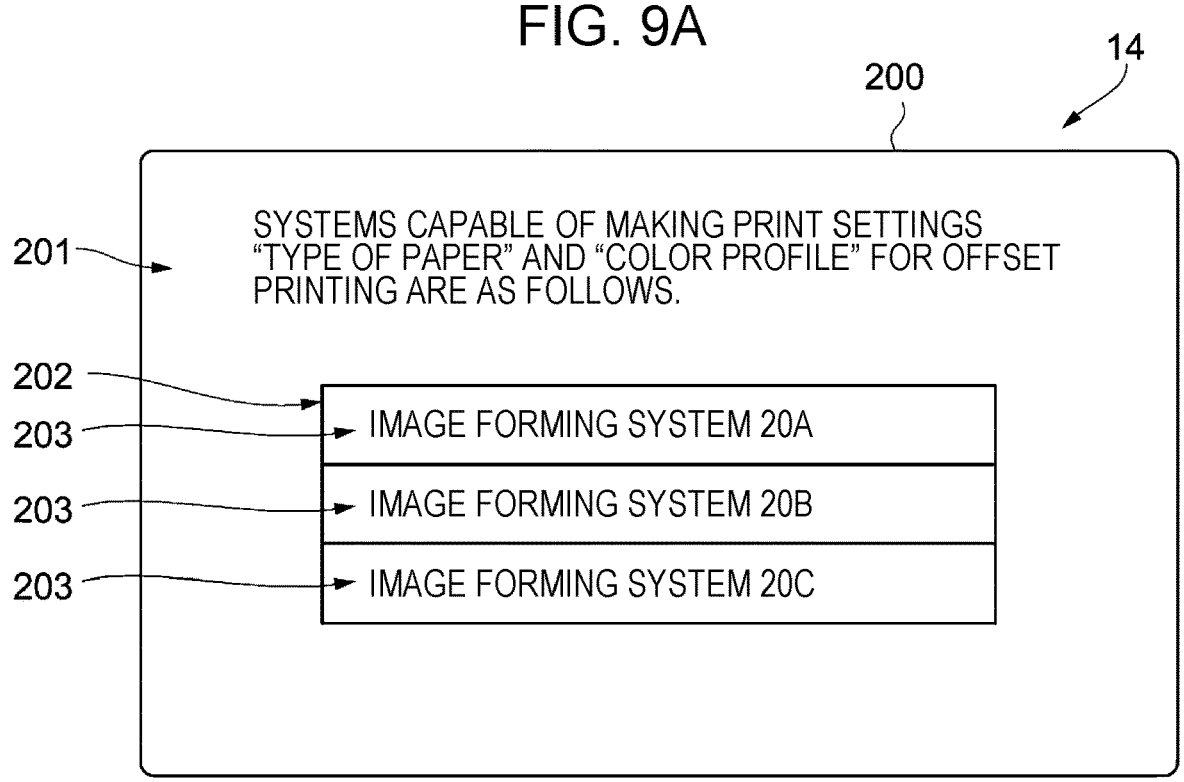
FIG. 9A is a diagram illustrating information displayed on a display device when plural image forming systems capable of performing digital printing based on print settings for offset printing have been extracted and FIG. 9B is a diagram illustrating information displayed on the display device when one image forming system capable of performing digital printing based on print settings for offset printing has been extracted.
Figure 9B:
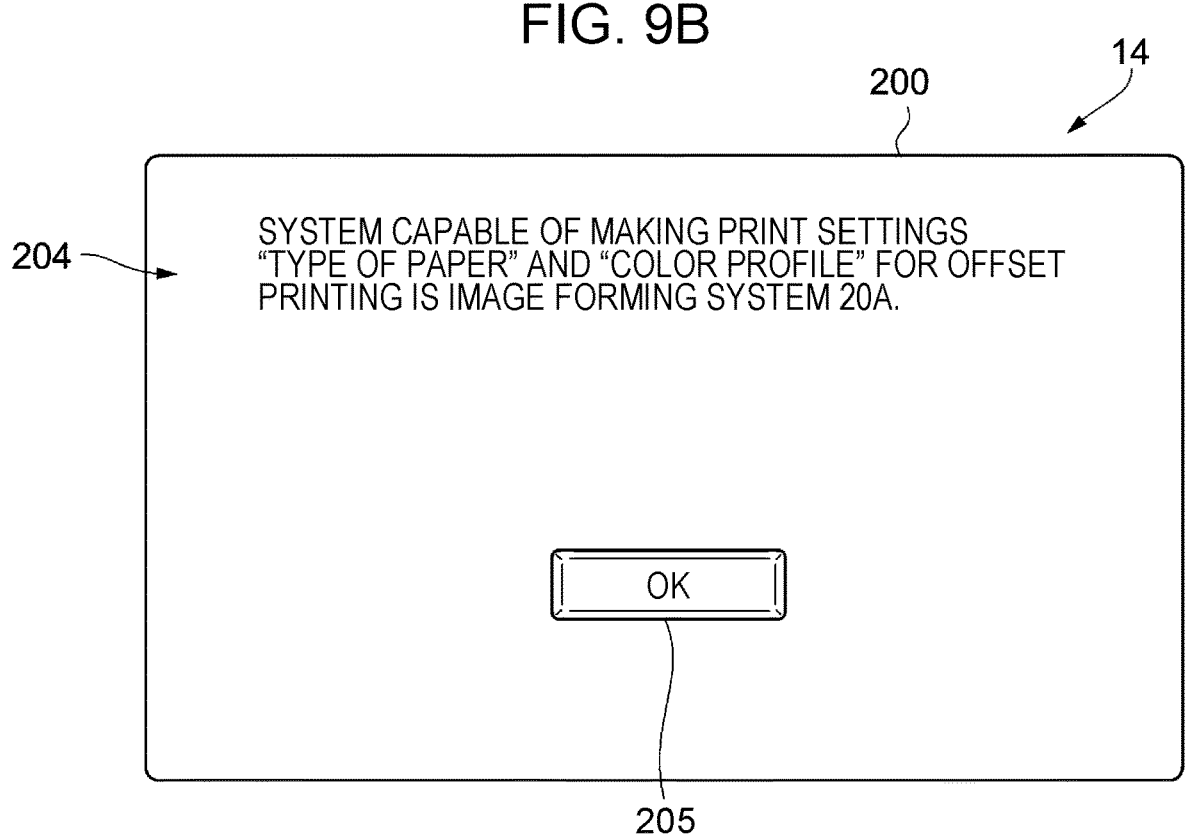

FIG. 9A is a diagram illustrating information displayed on the display device 14 when plural image forming systems 20 capable of performing digital printing based on print settings for offset printing have been extracted. FIG. 9B is a diagram illustrating information displayed on the display device 14 when one image forming system 20 capable of performing digital printing based on print settings for offset printing has been extracted.

If plural image forming system 20 capable of performing digital printing are extracted in the process for generating JDF data (refer to S102 in FIG. 8), the output control unit 111 displays a printing possible display screen 200 illustrated in FIG. 9A on the display device 14. The printing possible display screen 200 includes information regarding the image forming systems 20 capable of performing the digital printing based on the print settings for the offset printing. A setting item display section 201, a system list image 202, and system display sections 203 are displayed in the printing possible display screen 200.

The setting item display section 201 indicates print settings for the offset printings relating to the image forming systems 20. In the example illustrated in FIG. 9A, a text message, "Systems capable of making print settings "type of paper" and "color profile" for offset printing are as follows", is displayed in the setting item display section 201.

In the system list image 202, a list of the image forming systems 20 capable of performing the digital printing based on the print settings for the offset printing is displayed.

In the system display sections 203, names of the image forming systems 20 capable of performing the digital printing based on the print settings for the offset printing are displayed.

If the user selects any of the system display sections 203 displayed on the display device 14, S105 and the later steps of the process for generating JDF data (refer to FIG. 8) are performed on the selected image forming system 20.

If one image forming system 20 capable of performing the digital printing is extracted in the process for generating JDF data, an available system display section 204 and a selection section 205 are displayed in the printing possible display screen 200.

In the available system display section 204, information indicating print settings for the offset printing relating to the image forming system 20 and a name of the image forming system 20 capable of performing the digital printing based on the print settings for the offset printing are displayed. In the example illustrated in FIG. 9B, a text message, "System capable of making print settings "type of paper" and "color profile" for offset printing is image forming system 20A", is displayed in the available system display section 204.

If the user selects the selection section 205, S105 and the later steps of the process for generating JDF data are performed on the image forming system 20 extracted by the extraction unit 103, that is, the image forming system 20 indicated in the available system display section 204.

Next, information displayed on the display device 14 when the extraction unit 103 has extracted no image forming systems 20 capable of performing digital printing based on print settings for offset printing will be described.

Figure 10A:
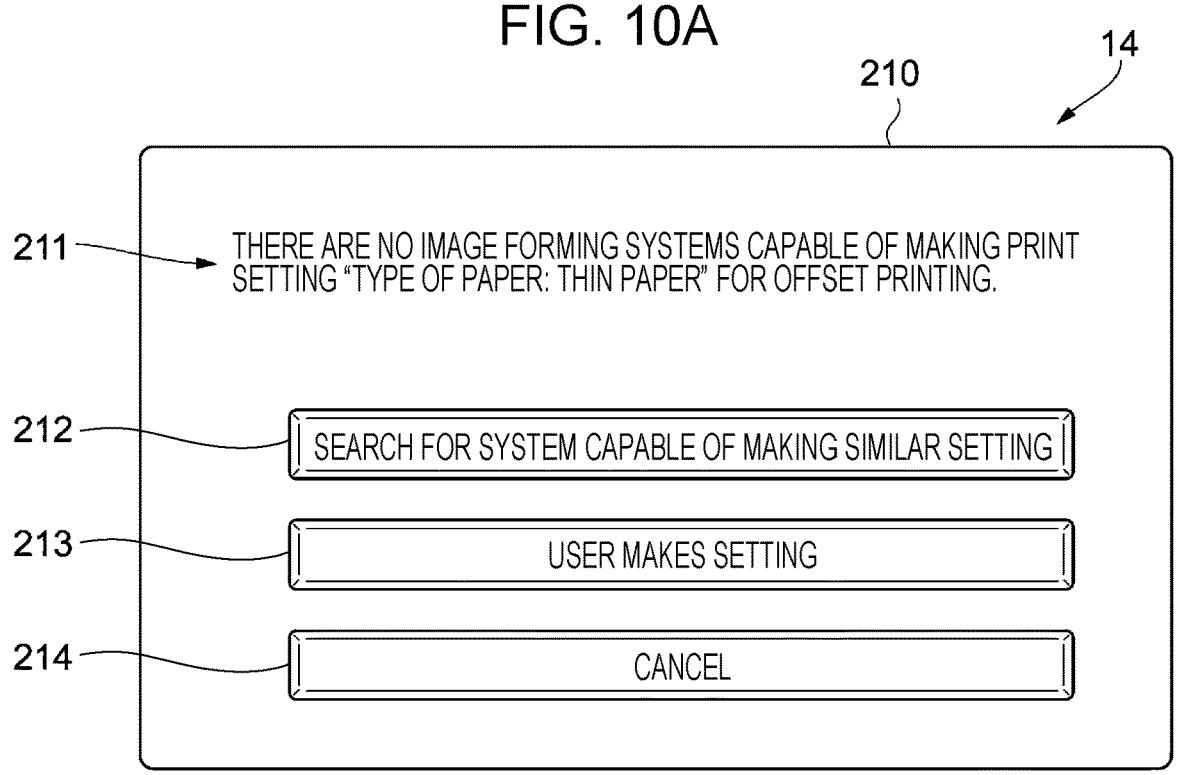
FIG. 10A is a diagram illustrating a reason display screen and FIG. 10B is a diagram illustrating a similar printing display screen.

FIG. 10A is a diagram illustrating a reason display screen 210. The reason display section 210 includes information indicating a reason why digital printing based on print settings for offset printing is not possible. The reason display section 210 is displayed if the extraction unit 103 determines that that are no image forming systems 20 capable of performing digital printing based on print settings for offset printing (refer to S102 in FIG. 8). The reason display section 210 includes a reason display section 211, a similar setting selection section 212, a user setting selection section 213, and a cancelation selection section 214.

The reason display section 211 indicates a print setting for the offset printing that cannot be made in the print settings of the image forming systems 20. In the example illustrated in FIG. 10, a text message, "There are no image forming systems capable of making print setting "type of paper: thin paper" for offset printing", is displayed in the reason display section 211.

If the user selects the similar setting selection section 212 (YES in S113 in FIG. 8), the extraction unit 103 determines whether there is an image forming system 20 capable of setting an item similar to an item of the print setting displayed in the reason display section 211 (refer to S102 in FIG. 8).

If the user selects the user setting selection section 213 (YES in S114 in FIG. 8), the display device 14 allows the user to set an item of a print setting for digital printing. The extraction unit 103 determines whether there is an image forming system 20 capable of setting the item of the print setting set by the user (refer to S102 in FIG. 8).

If the user selects the cancelation selection section 214 (NO in S114 in FIG. 8), generation of JDF data to be used for the digital printing is canceled. The cancelation selection section 214 may also be provided for the printing possible display screen 200 illustrated in FIG. 9A or 9B.

Figure 10B:
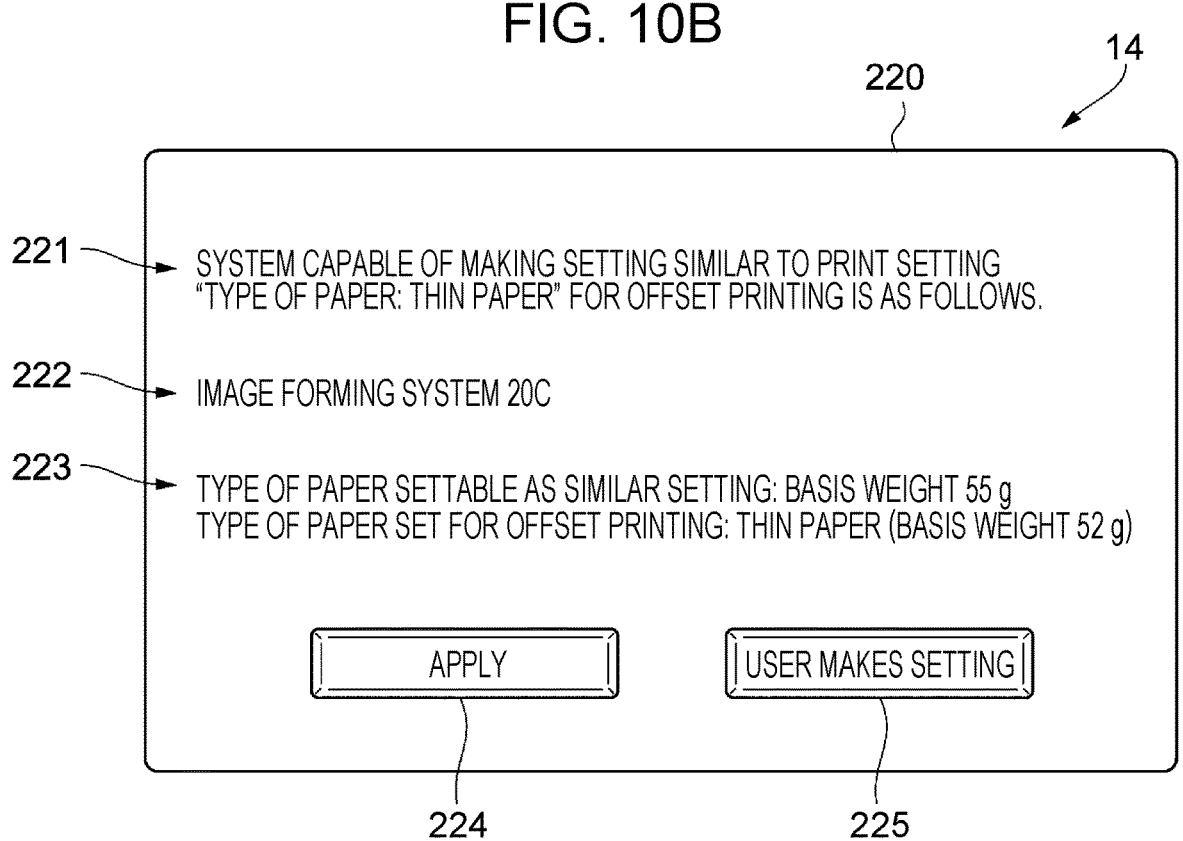

If the user has selected the similar setting selection section 212 and the extraction unit 103 has extracted an image forming system 20 capable of performing digital printing based on the setting similar to the print setting for the offset printing, the output control unit 111 displays a similar printing display screen 220 illustrated in FIG. 10B on the display device 14. The similar printing display screen 220 is a screen indicating information regarding the image forming system 20 capable of performing the digital printing based on the setting similar to the print setting for the offset printing. A similar setting display section 221, a similar system display section 222, a comparison section 223, an application selection section 224, and a user setting section 225 are displayed in the similar printing display screen 220.

The similar setting display section 221 indicates the setting similar to the print setting for the offset printing. In the example illustrated in FIG. 10B, a text message, "System capable of making setting similar to print setting "type of paper: thin paper" for offset printing is as follows", is displayed in the similar setting display section 221.

In the similar system display section 222, a name of the image forming system 20 capable of performing the digital printing based on the setting similar to the print setting for the offset printing is displayed.

In the comparison section 223, an item that can be set in the image forming system 20 as the item similar to the item of the print setting for the offset printing and the item of the print setting for the offset printing are displayed. In the example illustrated in FIG. 10B, text messages, "Type of paper settable as similar setting: Basis weight 55 g" and "Type of paper set for offset printing: thin paper (basis weight 52 g)", are displayed in the comparison section 223.

In the present exemplary embodiment, a type of paper whose basis weight is 90% to 110% of the basis weight of 52 g identified from the type of paper "thin paper", which is the item of the print setting for the offset printing, is determined as the setting similar to the print setting for the offset printing. The extraction unit 103 then extracts an image forming system 20 capable of setting a type of paper whose basis weight falls within the range as the image forming system 20 capable of performing the digital printing based on the setting similar to the print setting for the offset printing.

A type of paper whose basis weight falls within a predetermined range from the basis weight of a type of paper in print settings for offset printing is regarded as an item determined to be similar to an item of one of the print settings for the offset printing. The predetermined range may be any range, but is, for example, 90% to 110%. Alternatively, for example, a type of specification used for a color profile different from a type of specification used for a color profile in the print settings for the offset printing may be regarded as an item determined to be similar to an item of one of the print settings for the offset printing. Alternatively, a relationship between an item of one of the print settings for the offset printing and an item of the print setting for digital printing determined to be similar to the item of the print setting for the offset printing may be regarded as a predetermined relationship.

If the user selects the application selection section 224, S105 and the later steps of the process for generating JDF data (refer to FIG. 8) are performed on the image forming system 20 determined by the extraction unit 103 to be capable of performing the digital printing based on the setting similar to the print setting for the offset printing.

If the user selects the user setting section 225, the display device 14 allows the user to make a print setting for digital printing. The extraction unit 103 determines whether there is an image forming system 20 capable of setting an item of a print setting made by the user (refer to S102 in FIG. 8).

As described above, in the present exemplary embodiment the processor 11 of the management server apparatus 10 outputs information based on setting information with respect to whether digital printing based on print settings for offset printing is possible.

In addition, the processor 11 outputs setting information and information based on predetermined available items of print settings of the image forming apparatuses 21 that performs digital printing.

In addition, digital printing based on print settings for offset printing is digital printing whose available items of print settings have a predetermined relationship with corresponding items of print settings for the offset printing. The available items of print settings are a type of paper on which the offset printing has been performed and/or a type of specification used for color of images formed as a result of the offset printing.

If determining that there are plural image forming apparatuses 21 capable of performing digital printing based on print settings for offset printing, the processor 11 outputs information regarding each of the plural image forming apparatuses 21 capable of performing the digital printing based on the print settings for the offset printing.

In addition, the processor 11 sets the size of paper to be used in digital printing on the basis of items of print settings that can be set in an image forming apparatus 21 capable of performing digital printing based on print settings for offset printing.

In addition, the processor 11 sets the arrangement of images on sheets of paper to be used in digital printing on the basis of a set size of paper and items of settings of post-processing that can be set in a post-processing apparatus 22.

Furthermore, the processor 11 sets a position at which an image used to identify a timing of post-processing to be performed by a post-processing apparatus 22 on the basis of items of settings for post-processing that can be set in the post-processing apparatus 22.

In addition, if determining that there is no image forming apparatus 21 capable of performing digital printing based on an item of a print setting having a predetermined relationship with an item of the predetermined print setting for offset printing, the processor 11 outputs information regarding the print setting.

In addition, if determining that there are no image forming apparatuses 21 capable of performing digital printing based on the same item of a print setting as a predetermined item of the print setting for offset printing, the processor 11 outputs information regarding an item of the print setting having a predetermined relationship with the item of the print setting for the offset printing.

In addition, the processor 11 make settings about an area of a sheet to be cut off by a post-processing apparatus 22 on the basis of items of settings for post-processing that can be set in the post-processing apparatus 22.

Process for Generating JDF Data According to Modification

Figure 11:
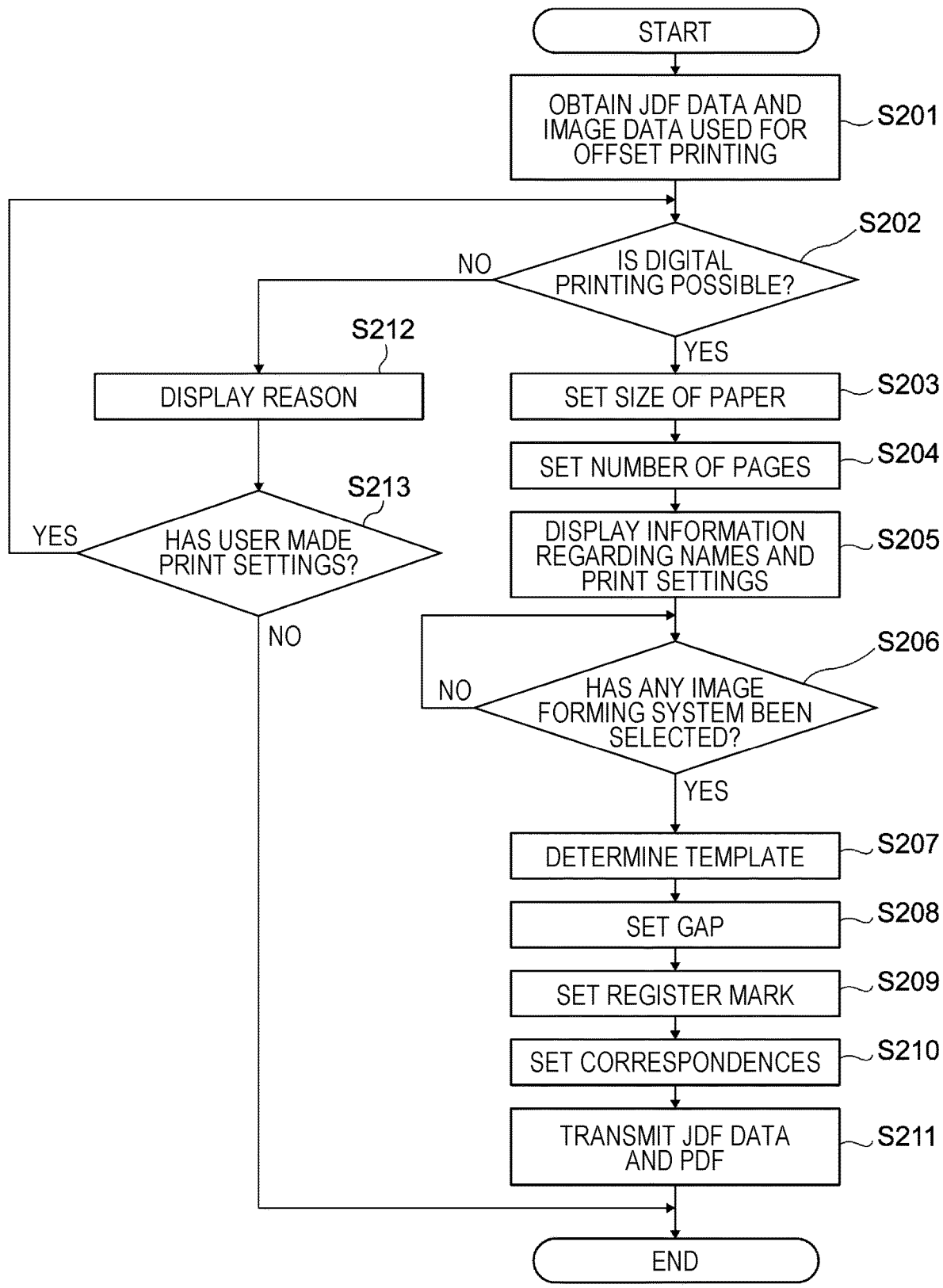
FIG. 11 is a flowchart illustrating a process for generating JDF data according to a modification.

Next, a process for generating JDF data according to a modification will be described. FIG. 11 is a flowchart illustrating the process for generating JDF data according to the modification.

First, the obtaining unit 101 obtains JDF data and image data used for offset printing (S201).

The extraction unit 103 determines whether digital printing based on print settings for the offset printing is possible (S202). In this modification, the extraction unit 103 determines whether the digital printing based on the print settings for the offset printing is possible by determining whether there are image forming systems 20 capable of performing digital printing based on the same settings as or similar settings to the print settings for the offset printing. Here, a relationship in which items of the print settings for the digital printing and items of the print settings for the offset printing are the same is regarded as a predetermined relationship. In addition, a relationship in which the items of the print settings for the digital printing and the items of the print settings for the offset printing are similar to each other may be regarded as a predetermined relationship.

If the extraction unit 103 determines that the digital printing is possible (YES in S202), the size setting unit 104 sets the size of paper to be used in the digital printing for each of the image forming systems 20 extracted by the extraction unit 103 (S203).

The number of pages setting unit 105 sets the number of pages assigned to each side of sheets to be used in the digital printing for each of the image forming systems 20 extracted by the extraction unit 103 (S204).

The output control unit 111 displays, on the display device 14, names of the image forming systems 20 extracted by the extraction unit 103 as image forming systems 20 capable of performing the digital printing based on the print settings for the offset printing and information regarding the print settings of the image forming systems 20 (S205).

The output control unit 111 determines whether the user has selected an image forming system 20 to perform the digital printing from the image forming systems 20 extracted by the extraction unit 103 as image forming systems 20 capable of performing the digital printing (S206). Until a result of S206 becomes positive, the output control unit 111 keeps performing S206.

If the user selects an image forming system 20 to perform the digital printing (YES in S206), on the other hand, the process proceeds to a next step. The subsequent steps S207 to S211 are the same as steps S107 to S111, respectively, of the process for generating JDF data illustrated in FIG. 8.

If the extraction unit 103 determines that there are no image forming systems 20 capable of performing the digital printing (NO in S202), on the other hand, the output control unit 111 displays, on the display device 14, a reason why the digital printing is not possible (S212).

The output control unit 111 then determines whether the user has made the print settings for the digital printing (S213). If the user has made the print settings (YES in S213), the extraction unit 103 compares items of the print settings set by the user with items of the print settings of the image forming system 20 that can be set and determines whether there is an image forming system 20 capable of performing printing based on the same print settings as or similar print settings to the print settings made by the user (S202). If the user has not made the print settings (NO in S213), on the other hand, the process for generating JDF data ends.

Next, information displayed on the display device 14 when the extraction unit 103 has extracted image forming systems 20 capable of performing digital printing in the process for generating JDF data according to the modification will be described.

Figure 12:
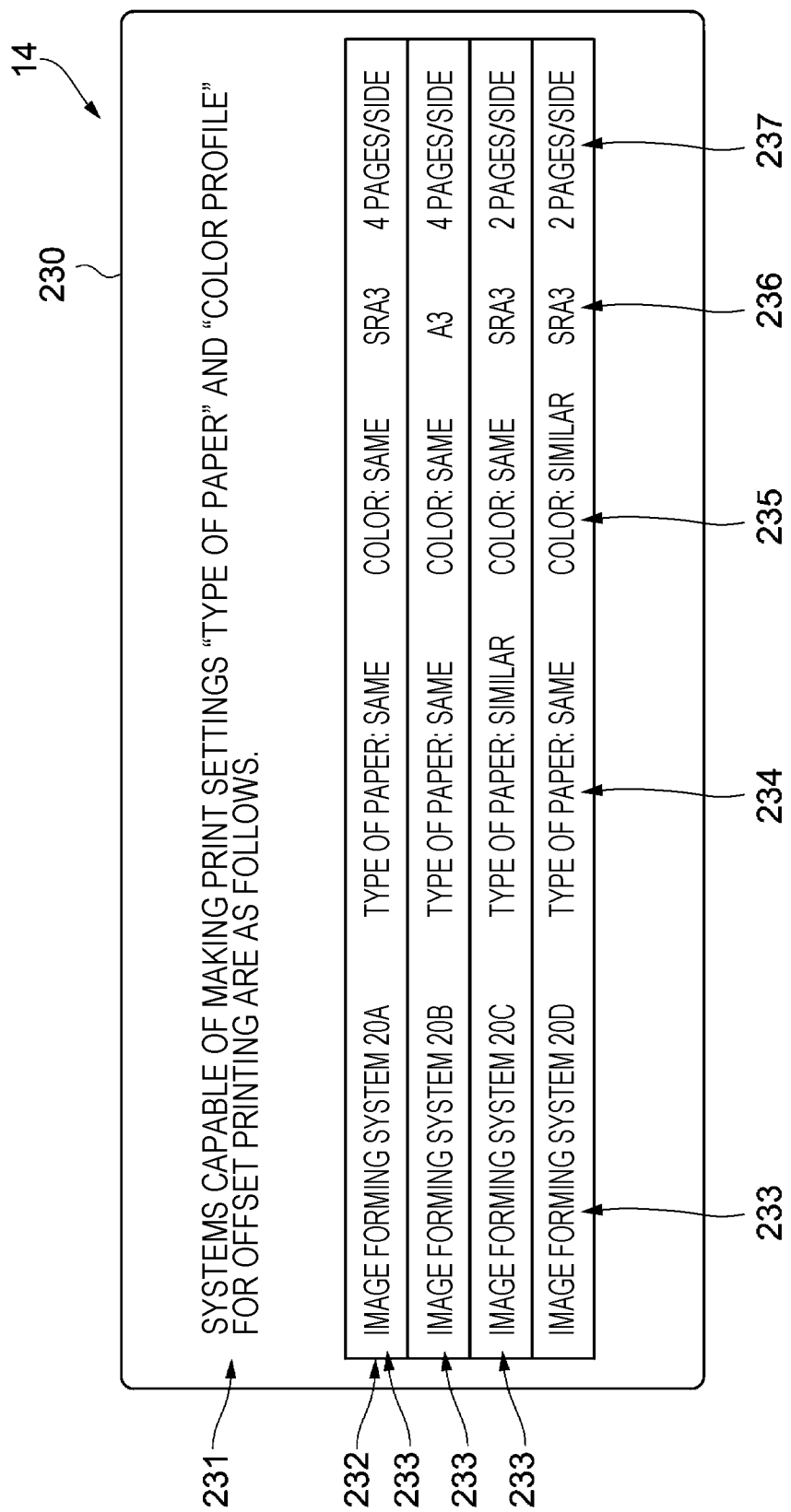
FIG. 12 is a diagram illustrating a printing possible display screen.

If plural image forming systems 20 capable of performing the digital printing are extracted in the process for generating JDF data according to the modification (refer to S202 in FIG. 10), the output control unit 111 displays a printing possible display screen 230 illustrated in FIG. 12 on the display device 14. A setting item display section 231, a system list image 232, system display sections 233, paper type display sections 234, color display sections 235, size display sections 236, and number of pages display sections 237 in the printing possible display screen 230.

The setting item display section 231 indicates print settings for the offset printing relating to the image forming systems 20. In the example illustrated in FIG. 12, a text message, "Systems capable of making print settings "type of paper" and "color profile" for offset printing are as follows", is displayed in the setting item display section 231.

In the system list image 232, a list of the image forming systems 20 capable of performing the digital printing based on the print settings for the offset printing is displayed.

In the system display sections 233, names of the image forming systems 20 capable of performing the digital printing based on the print settings for the offset printing are displayed.

The paper type display sections 234 indicate relationships between a type of paper set in the print settings for the offset printing and types of paper that can be set in the image forming systems 20. "Same" in the paper type display sections 234 indicates that the type of paper set in the print settings for the offset printing and the types of paper that can be set in the image forming systems 20 are the same. "Similar" in the paper type display sections 234 indicates that the type of paper set in the print settings for the offset printing and the types of paper that can be set in the image forming systems 20 are similar to each other.

The color display sections 235 indicate relationships between a type of specification used for a color profile set in the print settings for the offset printing and types of specification used for a color profile that can be set in the image forming systems 20. "Same" in the color display sections 235 indicates that the type of specification used for a color profile set in the print settings for the offset printing and the types of specification used for a color profile that can be set in the image forming systems 20 are the same. "Similar" in the color display sections 235 indicates that the type of specification used for a color profile set in the print settings for the offset printing and the types of specification used for a color profile that can be set in the image forming systems 20 are similar to each other.

The size display sections 236 indicate the size of paper to be used in the digital printing to be performed by the image forming systems 20.

The number of pages display sections 237 indicate the number of pages assigned to each side of sheets in the digital printing to be performed by the image forming systems 20.

If the user selects any of the system display section 233 displayed on the display device 14, S207 and the later steps of the process for generating JDF data (refer to FIG. 11) are performed on the selected image forming system 20 displayed on the system display section 233.

As described above, in the present exemplary embodiment, the processor 11 outputs information regarding print settings for digital printing performed by image forming systems 20 capable of performing digital printing based on print settings for offset printing.

Although an exemplary embodiment of the present disclosure has been described, the technical scope of the present disclosure is not limited to the above exemplary embodiment. It is obvious from the claims that the technical scope of the present disclosure includes modes obtained by modifying or improving the above exemplary embodiment in various ways.

Although the management server apparatus 10 obtains JDF data and image data from the content server apparatus 30 in the above exemplary embodiment, the management server apparatus 10 may obtain JDF data and image data from another apparatus, instead.

For example, the management server apparatus 10 may directly obtain JDF data and image data from a printing apparatus capable of performing offset printing.

In addition, although the size setting unit 104 of the management server apparatus 10 sets a maximum size of paper that can be set in print settings of an image forming system 20 as the size of paper to be used in printing to be performed by the image forming system 20 in the present exemplary embodiment, the size of paper to be set is not limited to this.

For example, when an image forming system 20 incapable of folding sheets is to perform printing, the size setting unit 104 may set a size of paper that can be set in print settings of the image forming system 20 and that is closest to the size of each page in offset printing as the size of paper to be used in printing. That is, depending on items of settings for post-processing that can be set in the image forming system 20, the size setting unit 104 may set a size different from a maximum size of paper that can be set in the print settings of the image forming system 20 as the size of paper to be used in printing to be performed by the image forming system 20.

In addition, although the extraction unit 103 extracts an image forming system 20 capable of performing digital printing based on print setting for offset printing on the basis of a type of paper and a type of specification used for a color profile set in print settings for offset printing in the present exemplary embodiment, a method for extracting an image forming system 20 is not limited to this.

For example, the extraction unit 103 may determine whether an image forming system 20 is capable of performing digital printing based on print settings for offset printing on the basis of whether the image forming system 20 is capable of setting a size of paper whose percentage in relation to a size of paper used in offset printing is equal to or higher than a certain value, instead. That is, the extraction unit 103 may use a print setting for offset printing different from the type of paper and the type of specification used for a color profile to determine whether an image forming system 20 is capable of performing digital printing based on print settings for the offset printing.

In addition, although, if the extraction unit 103 determines that digital printing based on print settings for offset printing is possible, the output control unit 111 displays, on the display device 14, names of image forming systems 20 capable of performing the digital printing in the present exemplary embodiment, information to be displayed is not limited to this.

For example, the output control unit 111 may display information indicating that digital printing based on print settings for offset printing is possible without displaying information regarding image forming systems 20, instead.

In addition, although, if the extraction unit 103 determines that digital printing based on print settings for offset printing is not possible, the output control unit 111 displays, on the display device 14, a reason why the digital printing is not possible in the present exemplary embodiment, information to be displayed is not limited to this.

For example, the output control unit 111 may display information indicating that digital printing based on print settings for offset printing is not possible without displaying a reason why the digital printing is not possible, instead.

In addition, although the storage unit 102 stores items of print settings that can be set in each image forming apparatus 21 in the present exemplary embodiment, the items of the print settings need not be stored in the storage unit 102.

For example, when determining whether digital printing based on print settings for offset printing is possible, the extraction unit 103 may obtain, from each image forming system 20, items of print settings that can be set in the corresponding image forming apparatuses 21, instead.

In addition, if there are no image forming systems 20 capable of setting the same items as ones of print settings for offset printing, for example, the extraction unit 103 may extract an image forming system 20 capable of setting items closest to items of the print settings for the offset printing. For example, if there are no image forming systems 20 capable of setting the same item for a type of paper in print settings for offset printing, the extraction unit 103 extracts an image forming system 20 capable of setting a type of paper whose basis weight is closest to that of the type of paper used in the offset printing. The output control unit 111 may then display, on the display device 14, information regarding the image forming system 20 extracted by the extraction unit 103 as well as information indicating that digital printing based on print settings for the offset printing is possible. In this case, a relationship between an item of a print setting for the offset printing and an item of a print setting that can be set in the image forming system 20 and that is closest to the item of the print setting for the offset printing may be regarded as a predetermined relationship.

In addition, the user may make print settings of each image forming system 20 including settings made in the management server apparatus 10 and settings that are not made in the management server apparatus 10.

In the embodiments above, the term "processor 11" refers to hardware in a broad sense. Examples of the processor include general processors (e.g., CPU: Central Processing Unit) and dedicated processors (e.g., GPU: Graphics Processing Unit, ASIC: Application-Specific Integrated Circuit, FPGA: Field Programmable Gate Array, and programmable logic device).

In the embodiment above, the term "processor 11" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
    obtain setting information regarding print settings for a first printing employing an offset printing plate;
    determine whether there is an image forming apparatus capable of performing a second printing that does not employ an offset printing plate and that is based on the print settings for the first printing; and
    output information based on the setting information with respect to whether the image forming apparatus is capable of performing the second printing,
    wherein the first printing and the second printing use common image data.

2. The information processing apparatus according to claim 1, wherein the processor is configured to:
    output information based on the setting information and an item of a predetermined print setting settable in an image forming apparatus that performs the second printing.

3. The information processing apparatus according to claim 2, wherein the second printing based on the print settings for the first printing is printing in which an item of a print setting settable for the second printing and an item of the print setting for the first printing have a predetermined relationship.

4. The information processing apparatus according to claim 3, wherein the print setting is a type of recording medium on which the first printing has been performed and/or a type of specification determined for color of an image formed as a result of the first printing.

5. The information processing apparatus according to claim 1, wherein, if it is determined that there are a plurality of image forming apparatuses capable of performing the second printing based on the print settings for the first printing, the processor is configured to:
    output information regarding each of the image forming apparatuses capable of performing the second printing based on the print settings.

6. The information processing apparatus according to claim 5, wherein the processor is configured to:
    output information regarding the print settings for the second printing performed by each of the image forming apparatuses.

7. The information processing apparatus according to claim 1, wherein the processor is configured to:
    set a size of a recording medium to be used in the second printing on a basis of an item of the print setting settable in an image forming apparatus capable of performing the second printing based on the print settings for the first printing.

8. The information processing apparatus according to claim 7, wherein the processor is configured to:
    set arrangement of an image on the recording medium to be used in the second printing on a basis of the set size of the recording medium and an item of a setting for post-processing settable in a post-processing apparatus that performs the post-processing on the recording medium on which the second printing has been performed.

9. The information processing apparatus according to claim 8, wherein the processor is configured to:
    set, on a basis of the item of the setting for the post-processing settable in the post-processing apparatus, a position on the recording medium at which an image for identifying a timing of the post-processing to be performed by the post-processing apparatus is to be formed.

10. The information processing apparatus according to claim 1, wherein, if determining that there is no image forming apparatus capable of performing the second printing based on an item having a predetermined relationship with an item of a predetermined one of the print settings for the first printing, the processor is configured to:
    output information regarding the item.

11. The information processing apparatus according claim 1, wherein, if determining that there is no image forming apparatus capable of performing the second printing based on a same item as an item of a predetermined one of the print settings for the first printing, the processor is configured to:
    output information regarding an item having a predetermined relationship with the item of the predetermined one of the print settings for the first printing.

12. The information processing apparatus according to claim 1, wherein the processor is configured to:
    set, on a basis of an item of a setting for post-processing settable in a post-processing apparatus that performs the post-processing on a recording medium on which the second printing has been performed, an area of the recording medium to be cut off by the post-processing apparatus.

13. A non-transitory computer readable medium storing a program causing a computer to execute a process comprising:
- obtaining setting information regarding print settings for a first printing employing an offset printing plate;
- determining whether there is an image forming apparatus capable of performing a second printing that does not employ an offset printing plate and that is based on the print settings for the first printing; and
- outputting information based on the setting information with respect to whether the image forming apparatus is capable of performing the second printing,
- wherein the first printing and the second printing use common image data.

14. An information processing apparatus comprising:
- means for obtaining setting information regarding print settings for a first printing employing an offset printing plate; and
- means for determining whether there is an image forming apparatus capable of performing a second printing that does not employ an offset printing plate and that is based on the print settings for the first printing; and
- means for outputting information based on the setting information with respect to whether the image forming apparatus is capable of performing the second printing,
- wherein the first printing and the second printing use common image data.

* * * * *